United States Patent [19]

Putt et al.

[11] 4,162,351

[45] Jul. 24, 1979

[54] METAL-HALOGEN CELL OPERATION WITH STORAGE OF HALOGEN VIA ORGANIC COMPLEXATION EXTERNAL TO THE ELECTROCHEMICAL CELL

[75] Inventors: Ronald A. Putt, Palatine; Mark J. Montgomery, Lake Zurich, both of Ill.

[73] Assignee: Electric Power Research Institute, Inc., Palo Alto, Calif.

[21] Appl. No.: 841,391

[22] Filed: Oct. 12, 1977

[51] Int. Cl.² ............................................. H01M 8/08
[52] U.S. Cl. ........................................ 429/15; 429/29; 429/199; 429/101
[58] Field of Search .................... 429/15, 19, 29, 50, 429/51, 101, 70, 199, 201, 72, 14

[56] References Cited

U.S. PATENT DOCUMENTS

| | | | |
|---|---|---|---|
| 3,823,036 | 7/1974 | Bjorkman, Jr. | 429/70 |
| 3,993,502 | 11/1976 | Bjorkman, Jr. | 429/51 |
| 4,020,238 | 4/1977 | Symons | 429/15 |
| 4,038,460 | 7/1977 | Walsh et al. | 429/15 |
| 4,065,601 | 12/1977 | Ajami et al. | 429/50 |
| 4,072,540 | 2/1978 | Symons et al. | 429/101 X |

OTHER PUBLICATIONS

A.F. Venero, Exxon's Zinc-Bromine Battery, Exxon Enterprises, Inc., Linden, N.J., Jul. 22, 1977.

*Primary Examiner*—Anthony Skapars
*Attorney, Agent, or Firm*—Leydig, Voit, Osann, Mayer & Holt, Ltd.

[57] ABSTRACT

A zinc-halogen cell system is provided in which the electrolyte circulates between the cell and an external storage for the halogen which provides the electrolyte with the necessary halogen concentration for efficient operation, energy efficiencies of about 70% being typically achieved.

10 Claims, 2 Drawing Figures

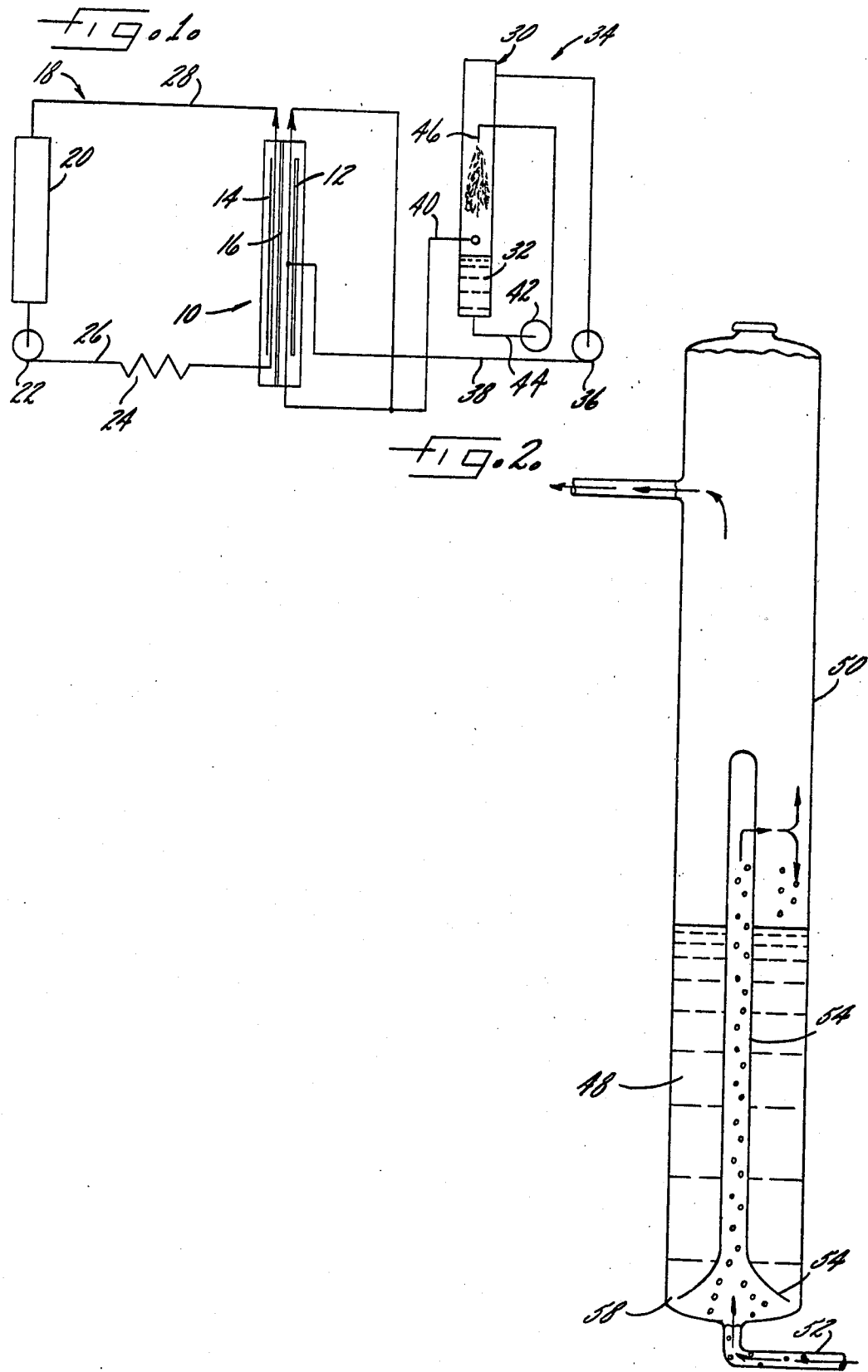

METAL-HALOGEN CELL OPERATION WITH STORAGE OF HALOGEN VIA ORGANIC COMPLEXATION EXTERNAL TO THE ELECTROCHEMICAL CELL

RELATED APPLICATION

Gibbard, Ser. No. 838,243, filed: Sep. 30, 1977, for: Complexing Agents for Zinc Bromine Storage Systems.

This invention relates to battery systems including a halogen positive electrode, such as zinc-halogen, and to an improved technique for reversibly complexing the halogen in such systems.

Conceptually, a zinc-bromine battery can be considered to be among the simplest of electrochemical systems in that only zinc, bromine and zinc bromide participate actively in the basic cell reaction. In its most elementary form, a rechargeable zinc-bromide battery could be constructed with two inert, electronically conductive electrode substrates and an aqueous solution of zinc bromide. A charge/discharge cycle would thus involve the electrodeposition and the subsequent anodic dissolution of zinc at the negative electrode and the liberation of bromine into the aqueous solution with its subsequent cathodic reduction at the positive electrode.

This inherent simplicity together with the fact that both of the electrode reactions occur with good electrochemical reversibility was recognized rather early. The early incentive was to develop a simpler alternative to the lead-acid battery. A strong commercial interest in this system has now been created by the emerging need for large-scale batteries for application in off-peak energy storage. The requirements for this application differ considerably from those of other rechargeable battery applications. The most important criteria which these batteries must satisfy are capital cost, cycle life, safety, energy efficiency and maintainability. In order to be competitive for the load leveling application, batteries face very stringent cost and cycle life requirements.

The early investigations of the zinc-bromine battery pinpointed two major problems. First, it has a relatively high self-discharge rate (viz., a low coulombic efficiency) resulting from the reaction of zinc with dissolved bromine. Secondly, there is a tendency for the zinc to electrodeposit dendritically, which can ultimately result in the short-circuiting of the cell.

Subsequent attempts to exploit the zinc-bromine system have accordingly focused on developing solutions to these two problems. Perhaps the major effort has been expended in various attempts to improve the coulombic efficiency by lowering the concentration of free bromine in the aqueous zinc bromide electrolyte. An early approach, described in U.S. Pat. No. 1,006,494, involved the use of porous carbon as the positive electrode structure. The usefulness of this technique was limited by the significant amount of carbon required to absorb the bromine, together with the reluctance of the material to release the bromine for cell discharge.

A further approach utilized has been to employ a complexing agent incorporated into the electrode structure. The use of quaternary ammonium bromides, such as tetramethylammonium bromide, is described in U.S. Pat. No. 2,566,114. Such materials form a series of polybromides up to a maximum bromination level of 9. In other words, four molecules of bromine per molecule of the organic compound could be utilized. Both solid and liquid polybromides were formed as the bromination level changed, creating difficulties in retaining the complexed compounds within the electrode structure as well as causing excessive electrode polarization.

Subsequently, as is described in U.S. Pat. No. 3,738,870, it is claimed that the performance of the bromine electrode can be significantly improved if only a single solid bromine complex is formed in the electrode structure. Apparently, to achieve the single solid bromine complex, it was necessary to add the bromine extremely slowly to solutions containing bromide ion and a fine suspension of the complexing agent in particulate form. Rapid addition of the bromine resulted in the formation of what were termed "mixed polybromide-bromine lumps".

More recently, it was noted that the presence of an aprotic dipole such as propylene carbonate in the electrolyte, together with a selected quaternary ammonium bromide, resulted in the formation of insoluble polybromide oils over a range of bromin-levels. This is described in U.S. Pat. No. 3,816,177.

Even more recently, U.S. Pat. No. 4,038,459 and 4,038,460 describe a large number of compounds which may be added to the electrolyte of halogen cells to complex the halogen. The '459 patent discloses various alcohols and nitriles which form insoluble oil-like complexes with halogens, which compounds may also include tetraalkylammonium moieties. The '460 patent shows various halogen complexing ethers, likewise including tetraalkylammonium moieties, which form insoluble, oil-like complexes with the halogens. A serious disadvantage with these alcohols, ethers, and nitriles is the quick chemical and electrochemical degradation of the compounds in the presence of bromine, making such compounds wholly unsuitable for use in the zinc-bromine system.

The copending Gibbard application provides quaternary ammonium salts for complexing bromine to form liquid polybromide oils over a range of bromination levels of at least 3 to 7 (i.e. - the bromination level of the oil is equal to $1 + 2$ times the number of moles of $Br_2$ present per mole of the tetraalkyl salt). The low viscosity oils formed allow sufficiently rapid transport of bromine between the oil and the aqueous electrolyte to achieve, in the charge phase, high coulombic efficiencies and, in the discharge phase, constant voltages.

What is important is that a system be provided which will utilize the advantageous properties of these polybromide oils (or a suitable halogen complexing agent) without sacrificing cell performance. It was previously thought, as is shown in U.S. Pat. No. 4,038,459 and '460, that it was necessary to orient the metal-halogen cell in a horizontal fashion with the halogen electrode facing up, so that the polyhalide oil phase would be in contact with the electrode surface. During charge, the halogen complex is formed on the electrode; some of the oil is then pumped to an external reservoir, from which it can be drained back into the cell for discharge.

This approach will typically not yield the energy efficiency required for applications such as load leveling. It would accordingly be useful to provide a system capable of achieving not only satisfactory energy efficiencies but also the other performance criteria. For example, zinc-bromide batteries, particularly of the size required for load leveling applications, are exothermic in operation. Thus, operating temperatures of up to 50 or 60° C. are necessary to provide the thermal driving force for sufficient heat removal from the cell to avoid an excessive temperature rise at practical current densities.

It is a principal of object of the present invention to provide a battery system including a positive halogen electrode characterized by a means for storing the halogen, which is capable of achieving a high energy efficiency. A related and more specific object provides such a system which is characterized by particularly high voltaic efficiencies.

A further object lies in the provision of such a system that allows electrode positioning in a vertical orientation.

Yet another object of this invention is to provide a zinc-halogen cell or battery system in which a flowing electrolyte is used.

A still further object provides a zinc-halogen battery system having satisfactory heat dissipation characteristics.

Other objects and advantages of the present invention will become apparent from the ensuing description, and from the drawings, in which:

FIG. 1 is a schematic view of a zinc-bromide cell illustrating external storage of bromine and flowing electrolyte in accordance with this invention, and FIG. 2 is a schematic view of a liquid-liquid contacting device showing a further embodiment capable of providing the necessary transport characteristics between the aqueous electrolyte and the polybromide oil phases.

While the invention is susceptible of various modifications and alternative forms, specific embodiments thereof are described in detail herein. It should be understood, however, that it is not intended to limit the invention to the particular forms disclosed, but, on the contrary, the intention is to cover all modifications, equivalents, and alternatives falling within the spirit and scope of the invention as expressed in the appended claims. Thus, for example, while the present invention will be principally described in connection with a zinc-bromine rechargeable cell or battery system, it should be appreciated that the present invention may likewise be employed in a zinc-chlorine system or, indeed, in any system in which a halogen positive electrode is utilized. As an illustration the present invention may be used in various redox systems.

The present invention is, in general, predicated on the discovery that the polybromide oils used to store the bromine should not be contained primarily within the cell and adjacent the bromine electrode. Rather, by storing the polybromide oil phase externally to the cell, and flowing the electrolyte through the cell and this external bromine store, not only is a high coulombic efficiency attainable, but also, high voltaic efficiencies are achieved. This system likewise allows the benefits of the vertical orientation of the electrodes to be achieved as well as good heat dissipation characteristics.

Turning now to FIG. 1, there is shown a schematic view of a zinc-bromide cell system in accordance with the present invention. The cell 10 includes a positive electrode (the bromine electrode) 12, a negative electrode (the zinc electrode) 14 and a separator 16 therebetween. It is desirable to use a separator having spacing ribs, which are generally parallel and are positioned to provide electrolyte flow channels. In accordance with one aspect of the present invention, as may be seen, the electrodes are positioned in a vertical orientation so as to allow venting of gases from the cell.

Suitable materials for construction of the electrodes are known, and the particular materials employed do not form a part of the present invention. As an illustrative example, the negative electrode substrate may suitably comprise a flat, non-porous titanium plate onto which zinc can be deposited. A flat sheet of porous titanium which is catalyzed with a ruthenium-containing coating may be utilized as the positive electrode substrate. Likewise, as should be apparent, the size and number of cells and/or electrodes employed may be varied as necessary for the particular application.

As is further known, the separator must be capable of minimizing the bromine transport rate from the positive electrode to the negative electrode. The material selected should be chemically inert in the cell environment and it should have a low resistance to the passage of ionic current. Various microporous and cation-exchange materials may be utilized and are known in the art. As one illustrative example, a conventional "Daramic" microporous polyethylene separator (W.R. Grace) has been found suitable.

To minimize the formation of zinc dendrites, a circulating electrolyte system is used. Since the electrolyte on the negative electrode side of the separator must typically have a much lower bromine concentration than the electrolyte on the positive electrode side, two separate flow loops are desirably provided. Generally, in a system of this type, the electrolyte will be under constant circulation, making many passes through the cell during a single charge-discharge cycle.

To this end, the negative side electrolyte flow, generally indicated at 18, includes an electrolyte reservoir 20, a pump 22 and a heat exchanger 24 for the electrolyte. The electrolyte is pumped from the reservoir 20 through line 26 and into the cell 10 adjacent the bottom thereof. The electrolyte is returned to reservoir 20 via line 28, exiting the cell 10 adjacent the top.

The bromine concentration on the negative electrode side should be kept extremely low (viz. - about 0.005 molar) so as to minimize the nonfaradaic zinc-bromine reaction. While theoretically the separator should keep this concentration low, no separator will totally prevent bromine transport, each particular type having a limit to the concentration gradient which it can sustain before allowing excessive bromine flow. For this reason, there will thus exist a distinct operational upper limit on the positive side electrolyte bromine concentration, based on the performance of the separator.

In accordance with a primary aspect of the present invention, external storage of the bromine is provided, with the electrolyte being circulated between the cell and the bromine storage means. And, importantly, means are utilized which enhance the rate of transport between the oil and electrolyte phases at current densities that would be satisfactory for most applications. To this end, as is shown in FIG. 1, there is provided a liquid-liquid contacting device 30 in which the polybromide oil 32 is stored at the bottom of the device. The positive side electrolyte flow, generally indicated at 34, includes a pump 36 for the electrolyte which circulates the electrolyte from the contacting device 30 to the cell 10 via line 38 and from the cell 10 back to the device 30 through line 40.

To achieve the mechanical agitation necessary for satisfactory mass transport characteristics in this embodiment, a pump 42 removes 48 oil from adjacent the bottom of the contacting device 30 via line 44 and reintroduces the oil in droplet form into device 30 through nozzle 46. Being more dense than the aqueous electrolyte, the oil collects in the bottom of the mixing chamber of the liquid-liquid contacting device 30, typically comprising a vertical tube of glass or other material inert to the halogen system. Intimate contacting between the two phases will occur because of the high relative velocity of the oil as it falls through the rising electrolyte.

An alternative embodiment of a liquid-liquid contacting device is shown in FIG. 2. In this embodiment, the oil 38 is retained in the bottom of the column 50, and the electrolyte is introduced into the bottom of the column through line 52. The electrolyte is pumped up through the interior tube 54, having openings 56 about the periphery of the bottom 58. In this fashion, liquid-liquid contact is provided as the electrolyte entrains the oil in its rise through the tube 54 due to the electrolyte velocity at the entrance to the column. The liquid-liquid contact is aided by the oil droplet dispersion action of the stream as it impinges on the column wall via the outlet hole on the side of the interior tube. From this point, the oil droplets, being the more dense phase, fall into the reservoir of oil at the bottom of the column while the electrolyte rises to exit the column at the top.

The FIG. 2 embodiment only requires a pump for the electrolyte, no pump for the oil being required as in the embodiment of FIG. 1. This may prove advantageous in some situations. The particular type of liquid-liquid contact device used will depend upon the overall performance characteristics and economic considerations required for the particular application.

In this circulating electrolyte system a porous, flow-through positive electrode is used because of its highly efficient mass transport properties, which enhance the efficiency of the battery.

While the oil has been described as being externally stored, it should be appreciated that some oil will be present in the electrolyte which returns to the cell. Indeed, it has been found that the porous flow-through bromine electrode becomes, in effect, saturated very rapidly with oil. After this point, a steady state operation results, and no additional buildup of any appreciable significance occurs. This oil retention by the electrode does not alter the significant benefits achieved by the external storage feature of the present invention.

Any complexing agents for the bromine or chlorine may be utilized which form liquid oils of satisfactorily low viscosity to achieve the necessary mass transport characteristics. The agents employed must, of course, form liquid polyhalides at the operating conditions that will be encountered. The viscosity of the resulting oils should be no more than about 30 centipoise at the operating temperature of the cell (which may be up to about 50° to 60° C.), preferably less than about 20 centipoise and most preferably no more than 10 to 15 centipoise. These relatively low viscosities will provide the necessary rate of halogen transport between the phases to achieve satisfactorily high energy efficiencies.

More particularly, in the transport of bromine between the aqueous electrolyte phase and the polybromide oil phase, the rate-limiting step typically occurs within the oil phase because of its higher viscosity. This is apparent from the equations defining the mass transfer coefficients in liquid-liquid extraction operations. Under typical operating conditions, the mass transfer coefficient for the oil phase is as small as that for the aqueous phase only for an oil phase viscosity approaching zero. A further important consideration regarding the oil phase viscosity is that of the power required to provide effective mixing of the oil and aqueous phases. As an example, for the contacting device as is shown in FIG. 1, the pumping power for constant oil flow rate is linearly proportional to the viscosity of the oil. The more viscous oils thus require more power to drive the pump, resulting in a lower overall energy efficiency for the system.

The importance of using low viscosity oils can likewise be appreciated in considering the functions involved in the charge-discharge cycle. In the charge phase, increasing oil viscosity lowers the coulombic efficiency since the rate of transport of the bromine into the oil phase becomes too slow, resulting in excessive self-discharge. On the other hand, during the discharge phase, too slow bromine transport from the oil to the electrolyte results in poor voltaic performance.

To serve as the complexing agents for bromine, it is preferred to utilize the tetraalkylammonium salts described in the copending Gibbard invention. Thus, one or more tetraalkylammonium salts may be utilized to form the necessary polybromide oils. As suitable examples, the tetraalkyl moieties, each of which form liquids over the three to nine range of bromination levels at room temperature, include diethyldimethyl, ethyltrimethyl, ethyldimethylpropyl, diethylmethylpropyl, ethylmethyldipropyl and dimethyldipropyl. Other useful embodiments, including mixtures of various tetraalkylammonium salts, are described in the Gibbard application.

The polybromide oils used may likewise be prepared in any desired fashion, as is described in the Gibbard application. As an example, the oils may be prepared by dissolving the desired bromide or other salt in water and then adding liquid bromine in at least an equilmolar amount. The oil will form instantly and may be collected at the bottom of the vessel, either by pipetting or by use of a separatory funnel.

Organic complexation of the bromine allows independent control of its aqueous phase concentration. The relative amount of the salt that should be used may be determined by working backwards from the bromine partition for the polybromide oil having the highest bromination level desired in use. The number of moles of bromine that will be produced in the particular size cell being used and the bromination level of the oil or salt desired for use in the startup of the operation will then dictate the amount of the oil or salt that should be added. Thus, if it is desired to end up with the bromine partition and other characteristics provided by an oil having a bromination level of 7 and if 10 moles of bromine will theoretically be produced, 5 moles of the oil at a bromination level of 3 should be utilized.

As to the considerations which apply in setting the particular concentration range, the bromine concentration should desirably be kept as low as possible so as to minimize the severity of materials degradation that could be caused by the bromine, in addition to increasing the coulombic efficiency. On the other hand, an operational lower limit arises from the requirement of mass transport of dissolved bromine to the positive electrode substrate during discharge. As may be appreciated, an unacceptable concentration polarization could well result if this transport is retarded.

Suitably, when an aqueous zinc-bromide electrolyte of one molar concentration is utilized with a porous, flow-through electrode, as is illustrated, it is preferred to use a polybromide oil that will allow maintaining the bromine concentration in the range of from about 5 to 15 grams per liter of electrolyte solution, most preferably 5 to 10. The use of a non-flow-through electrode will require a significantly higher bromine concentration for satisfactory operation.

It will also be found generally desirable to maintain the pH of the electrolyte within certain limits to provide satisfactory performance at the negative electrode. Thus, as is known, at a pH of about 4 or more, the zinc plated out during the charge phase will be somewhat mossy and not very adherent. This can result in a restriction of electrolyte flow with poor adherence, likewise causing a low coulombic efficiency. On the other hand, at a very low pH (i.e., less than 1), the acid corrosion of the zinc plate presents a problem, again resulting in poor coulombic efficiencies. For these reasons, utilization of a moderate pH in the range of 1–3 is preferred, this range achieving tightly adherent zinc platings. This will be inherently achieved in a zinc-bromine battery, as there are no reactions causing any rapid pH changes. An aqueous solution of zinc bromide has a pH of about 4. The hydronium ion concentration can then be increased through addition of either hydrochloric or hydrobromic acid.

Thus, in addition to being capable of providing coulombic efficiencies of 85% or even more, the present invention allows overall cell energy efficiencies of up to about 75% or greater. Energy efficiency of 70% is typical of the level achieved by using this invention.

The following Example is intended to be merely illustrative of the use of the present invention and not in limitation thereof.

EXAMPLE

This Example illustrates the typical performance of a zinc-bromine cell system in accordance with this invention (Cell A) and contrasts this performance with a cell system not including external storage of bromine (Cell B).

Two zinc-bromine nominal 32 Watt hour cells were constructed, using a circulating system as generally shown in FIG. 1. The parameters used that were common to each cell are as follows:

Electrolyte: 2m $ZnBr_2$/4m $KCl$/140μg/ml Pb
Electrolyte flow rate: About 3 ml/sec. (both positive and negative sides)
Negative side electrolyte: About 200 ml.

Cell B had about 5 l of electrolyte of the above composition on the positive side containing about 15 g bromine/liter. Cell A had about 300 ml of electrolyte on the positive side and about 30 ml of a polybromide oil (bromination level 3), formed using ethyltrimethylammonium bromide.

Each cell was cycled at 25° C., using the following parameters: charge current of 3 Amps. for 2 hours and a discharge current of 3 Amps. The voltaic($\eta_v$), coulombic ($\eta_c$) and energy ($\eta_E$) efficiencies obtained are set forth in Table 1:

Table 1

|  | $\eta_v$ | $\eta_c$ | $\eta_E$ |
|---|---|---|---|
| Cell A | 87 | 82 | 71 |
| Cell B | 82 | 74 | 61 |

The energy efficiency achieved for Cell A is representative of the values achieved in similar cycling tests. Higher efficiencies can be obtained by utilizing complexing agents that are capable of reducing the bromine concentration below the level that can be reached using the complexing agent set forth herein.

We claim:

1. A battery system comprising at least one cell, an electrolyte containing halogen therein and at least one negative electrode and one halogen positive electrode positioned in said cell, a storage means for halogen in the liquid phase located externally of the cell, means for circulating electrolyte between said storage means and said cell, and means providing sufficient liquid-liquid contact between the electrolyte and the halogen in said storage means to maintain the desired concentration of halogen in the electrolyte.

2. The system of claim 1 wherein a separator is positioned between the negative and positive electrodes.

3. The system of claim 2 wherein the electrolyte is continuously circulated between the cell and the storage means during operation.

4. The system of claim 2 wherein the negative electrode is a zinc electrode and the positive electrode is a bromine electrode.

5. The system of claim 4 where the electrolyte is circulated between the side of the cell containing the positive electrode and the storage means.

6. The system of claim 5 which includes an electrolyte reservoir for the side of the cell containing the negative electrode and means for circulating electrolyte between the reservoir and said cell.

7. The system of claim 4 wherein the bromine electrode is a porous, flow through electrode.

8. The system of claim 4 wherein the electrolyte is an aqueous zinc bromide solution and the pH is maintained within the range of from about 1 to 3.

9. A method of operating a battery system including at least one halogen positive electrode and an electrolyte containing halogen which comprises providing a storage for halogen in a liquid phase external of the cell, circulating electrolyte between the halogen storage and the cell, and providing sufficient liquid-liquid contact in the storage between the electrolyte and the halogen to maintain the desired concentration of halogen in the electrolyte.

10. The method of claim 9 wherein the cell is a zinc-bromine cell.

* * * * *

REEXAMINATION CERTIFICATE (118th)
United States Patent [19]
Putt et al.

[11] B1 4,162,351

[45] Certificate Issued  Aug. 16, 1983

[54] METAL-HALOGEN CELL OPERATION WITH STORAGE OF HALOGEN VIA ORGANIC COMPLEXATION EXTERNAL TO THE ELECTROCHEMICAL CELL

[75] Inventors: Ronald A. Putt, Palatine; Mark J. Montgomery, Lake Zurich, both of Ill.

[73] Assignee: Electric Power Research Institute, Inc., Palo Alto, Calif.

Reexamination Request:
No. 90/000,037, Jul. 29, 1981

Reexamination Certificate for:
Patent No.: 4,162,351
Issued: Jul. 24, 1979
Appl. No.: 841,391
Filed: Oct. 12, 1977

[51] Int. Cl.³ .................. H01M 8/08; H01M 4/60
[52] U.S. Cl. ............................... 429/15; 429/29; 429/51; 429/101; 429/199
[58] Field of Search ............ 429/15, 17, 19, 29, 429/50, 51, 70, 101, 198, 199, 200, 201

[56] References Cited

U.S. PATENT DOCUMENTS

| | | | |
|---|---|---|---|
| 3,823,036 | 7/1974 | Bjorkman, Jr. | 429/70 |
| 3,993,502 | 11/1976 | Bjorkman, Jr. | 429/51 |
| 4,020,238 | 4/1977 | Symons | 429/15 |
| 4,038,460 | 7/1977 | Walsh et al. | 429/15 |
| 4,065,601 | 12/1977 | Ajami et al. | 429/15 |
| 4,072,540 | 2/1978 | Symons et al. | 429/101 X |
| 4,105,829 | 8/1978 | Venero | 429/15 |

FOREIGN PATENT DOCUMENTS

853254 10/1977 Belgium .

OTHER PUBLICATIONS

A. F. Venero, Exxon's Zinc-Bromine Battery, Exxon Enterprises, Inc., Linden, N.J. Jul. 22, 1977.

*Primary Examiner*—Anthony Skapars

[57] ABSTRACT

A zinc-halogen cell system is provided in which the electrolyte circulates between the cell and an external storage for the halogen which provides the electrolyte with the necessary halogen concentration for efficient operation, energy efficiencies of about 70% being typically achieved.

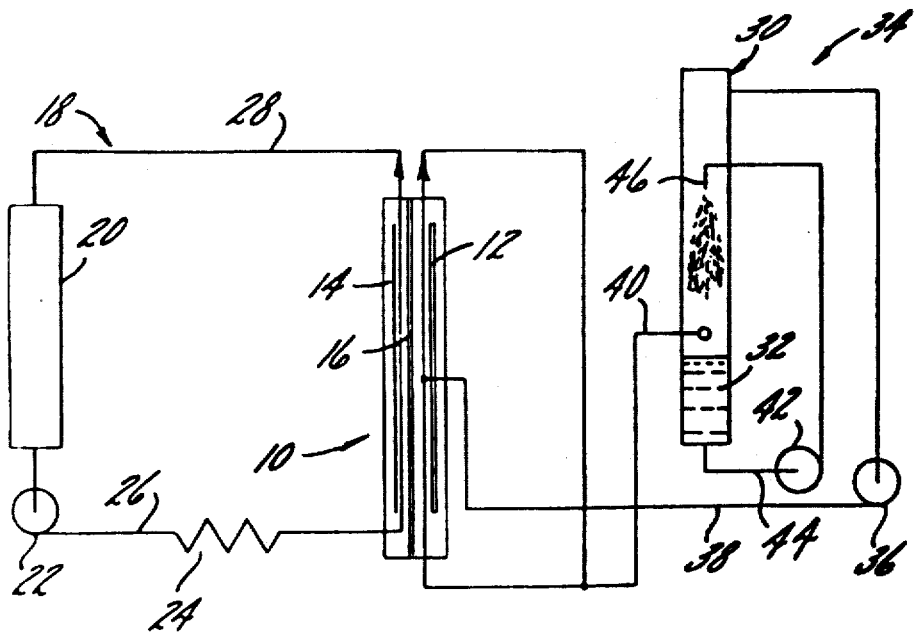

REEXAMINATION CERTIFICATE ISSUED UNDER 35 U.S.C. 307.

METAL-HALOGEN CELL OPERATION WITH STORAGE OF HALOGEN VIA ORGANIC COMPLEXATION EXTERNAL TO THE ELECTROCHEMICAL CELL

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 7, having been finally determined to be unpatentable, are cancelled.

Claims 2–6 and 8–10 are determined to be patentable as amended:

New claims 11–13 are added and determined to be patentable.

2. The system of claim [1] *12 or 13* wherein a separator is positioned between the negative and positive electrodes.

3. The system of claim 2 wherein [the electrode] *said aqueous liquid* is continuously circulated between the cell and the storage means during operation.

4. The system of claim 2 wherein the negative electrode is a zinc electrode and the positive electrode is a bromine electrode.

5. The system of claim 4 where the electrolyte is circulated between the side of the cell containing the positive electrode and the storage means.

6. The system of claim 5 which includes a [an electrolyte] reservoir *for said aqueous liquid* for the side of the cell containing the negative electrode and means for circulating [electrolyte] *said aqueous liquid* between the reservoir and said cell.

8. The system of claim 4 wherein the [electrolyte] *aqueous liquid* is an aqueous zinc-bromide solution and the pH is maintained within the range of from about 1 to 3.

9. A method of operating a battery system including at least one halogen positive *porous, flow through* electrode and [an electrolyte] *an aqueous liquid containing* halogen *and electrolyte in solution therein* which comprises providing a storage for halogen in a *non-aqueous* liquid phase external of the cell, circulating [electrolyte] *said aqueous liquid* between the halogen storage and the cell, and providing sufficient liquid-liquid contact in the storage between [the electrolyte] *said aqueous liquid* and the halogen *in said non-aqueous liquid* to maintain the desired concentration of halogen in the electrolyte [.] *during cell discharge by pumping a stream of one of said liquids into the other of said liquids to form droplets of said non-aqueous liquid, and allowing said droplets to traverse through said aqueous liquid and collect in a stationary non-aqueous phase in said storage means, and simultaneously withdrawing said aqueous liquid from said storage means, whereby said non-aqueous phase is retained in said storage means during cell discharge.*

10. The method of claim 9 wherein the cell is a zinc-bromine cell.

*11. A battery system comprising at least one cell,*
  *an aqueous liquid containing halogen and electrolyte in solution therein,*
  *at least one negative electrode and one halogen positive porous electrode positoned in said cell,*
  *storage means for halogen in a non-aqueous liquid located external to said cell,*
  *wherein said storage means comprises means for effecting liquid-liquid contact between said aqueous liquid and said non-aqueous liquid during cell discharge by pumping a stream one of said liquids into the other of said liquids to form droplets of said non-aqueous liquid, and allowing said droplets to traverse through said aqueous liquid and collect in a stationary non-aqueous phase in said storage means, and simultaneously withdrawing the aqueous phase from said storage means while retaining said non-aqueous phase in said storage means during cell discharge.*

*12. A system according to claim 11 wherein said storage means comprises means for pumping a stream of said non-aqueous liquid into said aqueous liquid.*

*13. A system according to claim 11 wherein said storage means comprises means for pumping a stream of said aqueous liquid into said non-aqueous liquid.*

* * * * *